US012810181B2

(12) United States Patent
Alam et al.

(10) Patent No.: US 12,810,181 B2
(45) Date of Patent: Nov. 24, 2026

(54) METHOD AND SYSTEM FOR LEARNING MODELS FOR A MIXTURE OF DOMAINS (MOD)

(71) Applicant: Hitachi, Ltd., Tokyo (JP)

(72) Inventors: Mahbubul Alam, Fremont, CA (US); Ahmed Farahat, Santa Clara, CA (US); Dipanjan Ghosh, Santa Clara, CA (US); Jana Backhus, San Jose, CA (US); Teresa Gonzalez, Mountain View, CA (US); Chetan Gupta, San Mateo, CA (US)

(73) Assignee: HITACHI, LTD., Tokyo (JP)

( * ) Notice: Subject to any disclaimer, the term of this patent is extended or adjusted under 35 U.S.C. 154(b) by 987 days.

(21) Appl. No.: 17/981,107

(22) Filed: Nov. 4, 2022

(65) Prior Publication Data

US 2024/0152787 A1 May 9, 2024

(51) Int. Cl.
*G06N 20/00* (2019.01)
*G06N 5/043* (2023.01)

(52) U.S. Cl.
CPC ............. *G06N 5/043* (2013.01); *G06N 20/00* (2019.01)

(58) Field of Classification Search
CPC ............................... G06N 5/043; G06N 20/00
See application file for complete search history.

(56) References Cited

U.S. PATENT DOCUMENTS

2023/0281510 A1* 9/2023 Royer .................... G06N 3/084 706/12
2023/0297653 A1* 9/2023 Das ......................... G06F 21/32 726/18

OTHER PUBLICATIONS

M. R. Karim et al., "Deep learning-based clustering approaches for bioinformatics," Brief. Bioinform., vol. 22, No. 1, pp. 393-415, 2021.
F. Tang et al., "Regression Based Clustering by Deep Adversarial Learning," IEEE Access, vol. 8, pp. 146744-146753, 2020.
X. Yang et al., "Adversarial learning for robust deep clustering," Adv. Neural Inf. Process. Syst., vol. 33, pp. 9098-9108, 2020.
Z. Chen et al., "Generalizable representation learning for mixture domain face anti-spoofing," arXiv Prepr. arXiv2105.02453, 2021.
F. Wang et al., "Understanding the behaviour of contrastive loss," in Proceedings of the IEEE/CVF conference on computer vision and pattern recognition, 2021, pp. 2495-2504.

* cited by examiner

*Primary Examiner* — Casey R. Garner
(74) *Attorney, Agent, or Firm* — PROCOPIO, CORY, HARGREAVES & SAVITCH LLP

(57) ABSTRACT

Example implementations described herein involve systems and methods for efficient learning for mixture of domains which can include applying a clustering technique to a set of data comprised of multiple domains to obtain an initial domain separation of the set of data into one or more clusters; training one or more experts associated with each of the one or more clusters based on the initial domain separation where each expert corresponds with one domain of the multiple domains; inputting all data points to the one or more experts for refining each of the one or more clusters using expert output probabilities; retraining the one or more experts based on the refined one or more clusters; and training a gating mechanism to route an input to an appropriate expert of the one or more experts based on the refined one or more clusters.

20 Claims, 9 Drawing Sheets

METHOD AND SYSTEM FOR LEARNING MODELS FOR A MIXTURE OF DOMAINS (MOD)

BACKGROUND

Field

The present disclosure is generally related to machine learning systems, and more specifically, to systems and methods involving learning models for mixture of domains.

Related Art

Many industrial applications offer data which may be comprised of samples obtained from multiple domains for which the underlying data may have substantially different distributions, which may be referred to as a Mixture of Domains (MoD). It is difficult to train conventional Machine Learning (ML) and Deep Learning (DL) models using such a mixture of different distribution data since the underlying assumption for training a robust ML or DL model is that the input data belongs to the same distribution. More intricately, in most cases the domain labels are unknown for the MoD data. A single ML/DL model trained using MoD data may fail to generalize and result in sub-par performance.

Existing ML/DL techniques such as domain adaptation, and transfer learning are designed to tackle cross-domain data. However, these techniques assume that the domain labels are available for the learning process. Consequently, domain adaptation and transfer learning techniques are unsuitable to learn from the MoD data without domain labels. Therefore, a novel learning technique is necessary to effectively handle complex MoD data In one example related art implementation existing ML/DL techniques may include clustering as a potential solution for the MoD without domain labels. DL based clustering techniques achieved superior performance over traditional ML techniques.

In another example related art implementation includes a deep autoencoder (AE) based clustering technique to separate tissues using microscopy images. The method trains the AE to learn meaningful features by reconstructing the microscopy image. Next, the learned latent features are fed to a traditional clustering technique such as k-means to separate the features in the high dimensional space. Subsequently, the AE is fine-tuned to refine the clusters by jointly optimizing the cluster loss and the reconstruction loss.

In another example related art implementation includes an AE based adversarial technique to perform the clustering task. The learned features from the AE are utilized to calculate the centroids of each cluster which is then used to compute the data distribution (considered as fake to the discriminator). The discriminator network is trained using an adversarial loss to distinguish between the fake data distribution and the real/target data distribution until the network fails to differentiate between fake and target data distribution.

In another example related art implementation includes seminal adversarial based clustering method that utilizes a framework of one encoder and two decoders to perform the clustering task. One decoder learns to reconstruct the image using the encoded features whereas the other decoder reconstructs the image using a slightly perturbed version of the encoded features. The purpose of such adversarial mechanism is to ensure that the perturbed features are similar to the clean features thereby the reconstructed images have fewer differences. Conversely, a pre-trained clustering network ensures that the clustering results are substantially different for the corresponding reconstructed images. The above-mentioned deep clustering methods are suitable for grouping similar data points within a specific domain, and hence, may fail to properly group data points belonging to different distributions.

In another example related art implementation includes a consideration of facial images without domain labels from different domains to solve a face anti-spoofing task. The method utilizes an adaptive domain separation and training approach using convolutional neural network (CNN) and meta learning. The importance of the features extracted at different layers of CNN are computed using an attention mechanism. The features with low attention struggle to separate the domains, and hence, are fed to a clustering technique to separate the domains. The resulting clusters are used as the pseudo label and fed into the convolutional blocks of the CNN to encourage the model to extract discriminative domain features. Though the method handles MoD without domain labels, the technique heavily relies on the underlying clustering technique in the adaptive process to separate the domains. As such, the performance of the proposed technique may deteriorate in situations where the distributions of the domains are substantially different.

In another example related art implementation includes domain adaptation and transfer learning. However, both these techniques require the domain labels for the source and target which prohibits the use of domain adaptation and transfer learning as a solution for the MoD without domain labels.

SUMMARY

The present disclosure involves a clustering technique at a beginning for an initialization purpose. The present disclosure utilizes domain specific ML/DL models to perform a cluster refinement task. This ensures that the performance of the method relies on trained ML/DL models rather than a clustering technique. At least one advantage of the present disclosure is the use of domain-specific simpler ML/DL model in place of a very deep/complex ML/DL model. Since the distribution of the domains in MoD are substantially different, a single ML/DL model may fail to generalize and affect the cluster refinement process resulting in poor overall performance. Furthermore, simpler domain specific ML/DL models are less prone to overfitting and generalizes better when training data is scarce.

Example implementations described herein involve an efficient iterative teaming mechanism for handling the unique yet crucial MoD data without domain labels. The present disclosure may solve a downstream task using domain specific experts while adapting the domains in an unsupervised fashion utilizing the outputs of the domain specific experts. More specifically, the iterative learning mechanism of the present disclosure involves an unsupervised learning technique for initializing the domain disentanglement/separation task, training domain specific experts for solving a downstream task such as classification, iteratively utilizing the expert outputs for refining the domain separation and re-training the experts using the refined data until the iterative process reaches some convergence criteria.

Domain separation refinement and downstream task performance improvement may occur in an iterative manner where a refinement module assists domain specific experts to improve the downstream task performance and vice versa. MoD data may be an example and failure prediction of equipment using historical data as an example downstream task. A clustering algorithm is used to disentangle/separate the MoD data. Next, based on the clustering outcome, a domain/cluster specific ML/DL model/expert is trained using a downstream task loss. The downstream task may be classification, regression, or any other problem specific task. Subsequently, the trained experts is utilized to get downstream task output probabilities using all the input MoD data. The probabilities are then used to refine the cluster assignments. Intuitively, if the output probability of an expert is higher than the domain specific expert trained for the input, it indicates that the input rightfully belongs to a different domain. More concretely, the input belongs to the domain corresponding to the expert offering higher probability. The refined clusters are then utilized to re-train the domain specific experts. The above cluster refining and re-training process are repeated until there is no further cluster refinement for certain number of iterations.

Aspects of the present disclosure include a method that involves applying a clustering technique to a set of data comprised of multiple domains to obtain an initial domain separation of the set of data into one or more clusters; training one or more experts associated with each of the one or more clusters based on the initial domain separation where each expert corresponds with one domain of the multiple domains; inputting all data points to the one or more experts for refining each of the one or more clusters using expert output probabilities; retraining the one or more experts based on the refined one or more clusters; and training a gating mechanism to route an input to an appropriate expert of the one or more experts based on the refined one or more clusters.

Aspects of the present disclosure further include a computer program storing instructions that involves applying a clustering technique to a set of data comprised of multiple domains to obtain an initial domain separation of the set of data into one or more clusters; training one or more experts associated with each of the one or more clusters based on the initial domain separation where each expert corresponds with one domain of the multiple domains; inputting all data points to the one or more experts for refining each of the one or more clusters using expert output probabilities; retraining the one or more experts based on the refined one or more clusters; and training a gating mechanism to route an input to an appropriate expert of the one or more experts based on the refined one or more clusters.

Aspects of the present disclosure include a system that involves means for applying a clustering technique to a set of data comprised of multiple domains to obtain an initial domain separation of the set of data into one or more clusters; means for training one or more experts associated with each of the one or more clusters based on the initial domain separation where each expert corresponds with one domain of the multiple domains; means for inputting all data points to the one or more experts for refining each of the one or more clusters using expert output probabilities; means for retraining the one or more experts based on the refined one or more clusters; and means for training a gating mechanism to route an input to an appropriate expert of the one or more experts based on the refined one or more clusters.

Aspects of the present disclosure can include a system that involves means for applying a clustering technique to a set of data comprised of multiple domains to obtain an initial domain separation of the set of data into one or more clusters; means for training one or more experts associated with each of the one or more clusters based on the initial domain separation where each expert corresponds with one domain of the multiple domains; means for inputting all data points to the one or more experts for refining each of the one or more clusters using expert output probabilities; means for retraining the one or more experts based on the refined one or more clusters; and means for training a gating mechanism to route an input to an appropriate expert of the one or more experts based on the refined one or more clusters.

Aspects of the present disclosure include a method that involves applying a clustering technique to a set of data comprised of multiple domains to obtain an initial domain separation of the set of data into one or more clusters; training one or more experts associated with each of the one or more clusters based on the initial domain separation where each expert corresponds with one domain of the multiple domains; providing a set of data comprised of multiple domains to each of one or more experts; inputting output data of each of the one or more experts, based on the set of data, into a shared expert, in order to re-train the shared expert; and calculating a loss function, based on an output of the shared expert, to re-train the one or more experts, wherein weights of the one or more experts are adjusted based on errors back propagated by the loss function.

Aspects of the present disclosure further include a computer program storing instructions that involves applying a clustering technique to a set of data comprised of multiple domains to obtain an initial domain separation of the set of data into one or more clusters; training one or more experts associated with each of the one or more clusters based on the initial domain separation where each expert corresponds with one domain of the multiple domains; providing a set of data comprised of multiple domains to each of one or more experts; inputting output data of each of the one or more experts, based on the set of data, into a shared expert, in order to re-train the shared expert; and calculating a loss function, based on an output of the shared expert, to re-train the one or more experts, wherein weights of the one or more experts are adjusted based on errors back propagated by the loss function.

Aspects of the present disclosure include a system that involves means for applying a clustering technique to a set of data comprised of multiple domains to obtain an initial domain separation of the set of data into one or more clusters; means for training one or more experts associated with each of the one or more clusters based on the initial domain separation where each expert corresponds with one domain of the multiple domains; means for providing a set of data comprised of multiple domains to each of one or more experts; means for inputting output data of each of the one or more experts, based on the set of data, into a shared expert, in order to re-train the shared expert; and means for calculating a loss function, based on an output of the shared expert, to re-train the one or more experts, wherein weights of the one or more experts are adjusted based on errors back propagated by the loss function.

Aspects of the present disclosure can include a system that involves means for applying a clustering technique to a set of data comprised of multiple domains to obtain an initial domain separation of the set of data into one or more clusters; means for training one or more experts associated with each of the one or more clusters based on the initial domain separation where each expert corresponds with one domain of the multiple domains; means for providing a set of data comprised of multiple domains to each of one or more experts; means for inputting output data of each of the one or more experts, based on the set of data, into a shared expert, in order to re-train the shared expert; and means for calculating a loss function, based on an output of the shared expert, to re-train the one or more experts, wherein weights of the one or more experts are adjusted based on errors back propagated by the loss function.

BRIEF DESCRIPTION OF DRAWINGS

FIG. 213 illustrates an example of a clustering outcome using equipment MoD example, in accordance with an example implementation.

FIG. 61B illustrates an example diagram for the trained gate to route input to the correct expert using the equipment MoD example, in accordance with an example implementation.

DETAILED DESCRIPTION

Figure 1:
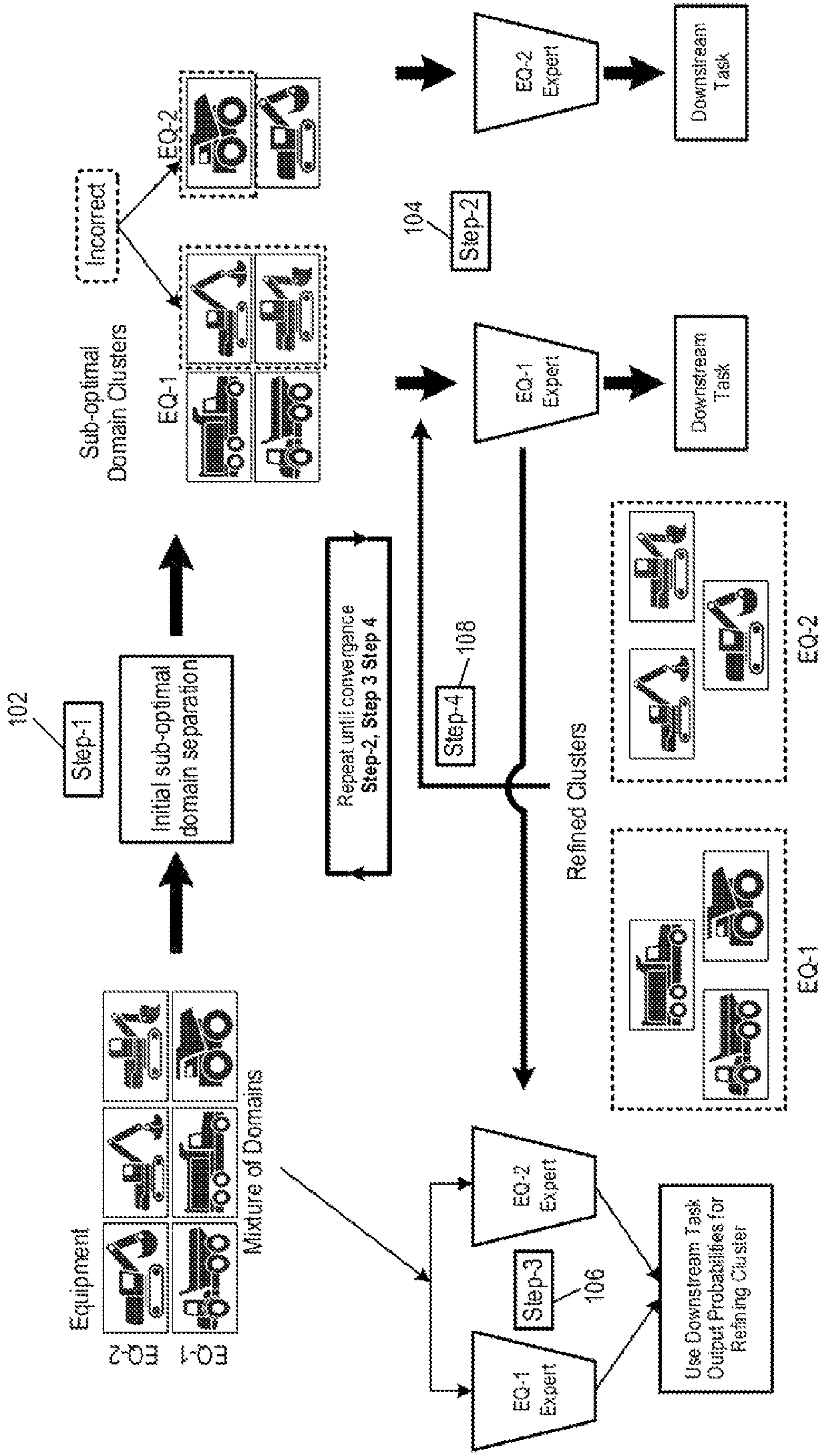
FIG. 1 illustrates an example of a framework of the iterative learning process, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Iterative learning for MoD without domain labels may be accomplished by the following steps; i) Apply an unsupervised clustering technique such as k-means, deep clustering to obtain the initial domain separation, ii) Train domain specific ML/DL models/experts for solving a downstream task such as classification, iii) Obtain expert output probabilities by feeding all the inputs. Utilize the output probabilities to refine the clusters and retrain the experts using the refined clusters. Repeat this step until convergence, iv) Using the final refined cluster train a neural network Gate to route the input data to the corresponding domain specific expert. Each of these steps are described herein. In some aspects, the steps may occur in any order and the disclosure is not intended to be limited to the aspects disclosed herein.

FIG. 1 illustrates an example of a framework of the iterative learning process. The domain separation refinement and downstream task performance improvement may occur in an iterative manner where the refinement module assists the domain specific experts to improve the downstream task performance and vice versa. FIG. 1 shows an example of MoD containing two substantially different equipment domains. MoD data may be an example and failure prediction of equipment using historical data as an example downstream task.

First, as shown in Step-1 102, a clustering algorithm is used to disentangle/separate the MoD data. Naturally, a naïve clustering algorithm may result in sub-optimal clustering result due to the intricate nature of the MoD data. However, the sub-optimal clustering is sufficient to initialize our iterative learning algorithm. Next, as shown in Step-2 104, based on the clustering outcome, the domain/cluster specific ML/DL models/experts are trained using a downstream task loss. The downstream task may be classification, regression, or any other problem specific task. Subsequently, the trained experts are utilized to get downstream task output probabilities using all the input MoD data, as shown in Step-3 106. The probabilities are then used to refine the cluster assignments, as shown in Step-4 108. In some aspects, if the output probability of an expert is higher than the domain specific expert trained for the input, it may indicate that the input rightfully belongs to a different domain. More concretely, the input belongs to the domain corresponding to the expert offering higher probability. The refined clusters are then utilized to re-train the domain specific experts. The above cluster refining and re-training process are repeated until there is no further cluster refinement for certain number of iterations. For example, the process may be repeated until convergence is achieved.

Figure 2A:
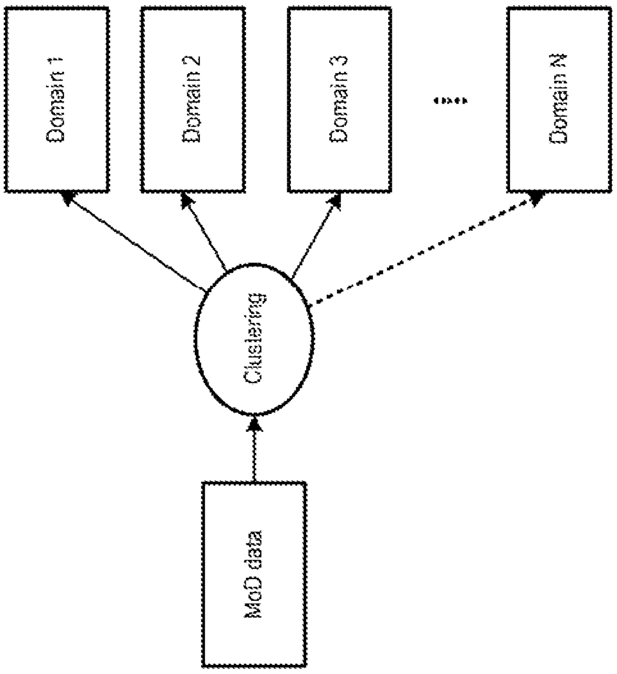
FIG. 2A illustrates an example of an initial domain clustering, in accordance with an example implementation.
Figure 2B:
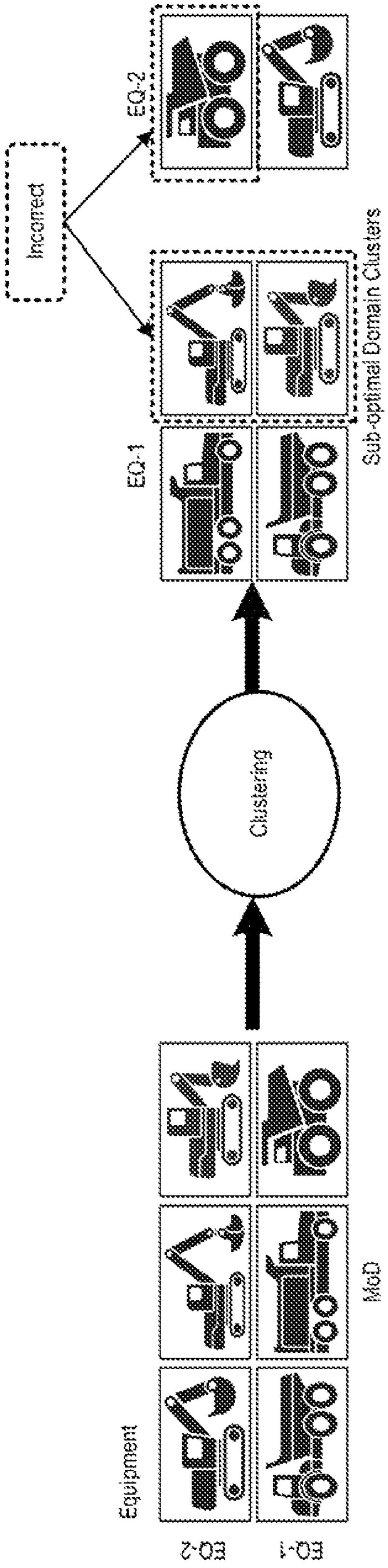

The first step of iterative process may comprise an initial domain clustering. The first step of the iterative process may apply a clustering technique such as, but not limited to, k-means, deep clustering to obtain an initial domain separation. The initial clustering allows for the instantiating of the iterative learning algorithm. FIG. 2A demonstrates a flow diagram of the initial clustering technique and FIG. 2B shows an example of MoD data comprising equipment MoD data.

Figure 3A:
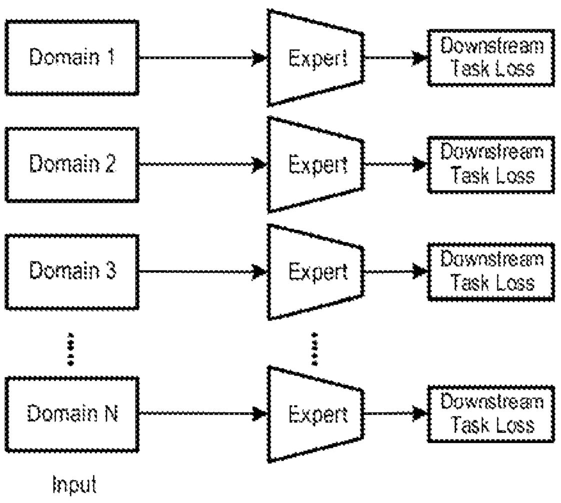
FIG. 3A illustrates an example of a training domain specific experts, in accordance with an example implementation.
Figure 3B:
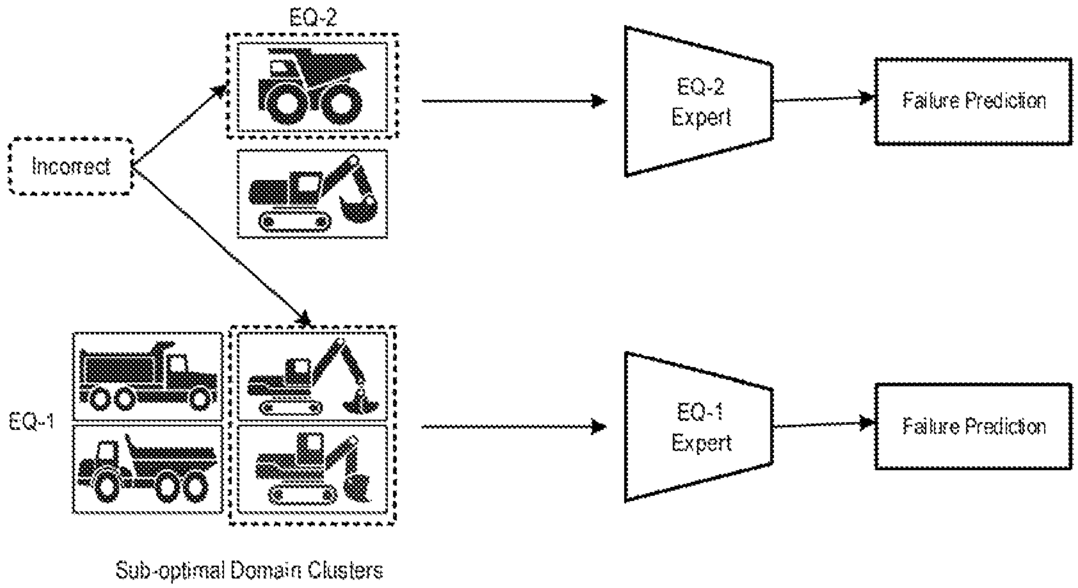
FIG. 3B illustrates an example of the training domain specific experts using the equipment MoD example, in accordance with an example implementation.

Individual ML/DL experts may be trained corresponding to each initial cluster obtained from the domain clustering, in order to obtain domain specific ML/DL trained experts. The experts are trained by optimizing a downstream task loss. As discussed herein, the downstream task is problem specific and failure prediction may be considered using historical equipment data as an example downstream task. FIG. 3A shows a diagram for training domain specific experts and FIG. 3B shows an example using the equipment domain. FIG. 3B further illustrates that there are two domain specific experts trained by optimizing the failure prediction loss using an equipment cluster EQ-1 and an equipment cluster EQ-2, respectively. In some aspects, the initial clustering algorithm may result in some samples being assigned or grouped to the wrong cluster, which may be refined in subsequent steps.

The previously trained experts may be utilized to refine the clusters, or clusters that include samples that should belong to another cluster based on the initial clustering algorithm, which may result in an iterative cluster refinement and/or a re-training of the experts. Intuitively, high failure prediction probability obtained from an expert indicates that the corresponding input belongs to the cluster the current expert represents though initially the input belonged to a different cluster. In other words, the re-assignment is done with a probability proportional to the probability assigned by different experts. This process is repeated for all the inputs to refine the clusters. Subsequently, the experts are re-trained using the refined clusters. The refinement and retraining process is repeated until convergence criteria is satisfied or met, such as there is no refinement in the clusters for certain number of iterations.

Figure 4:
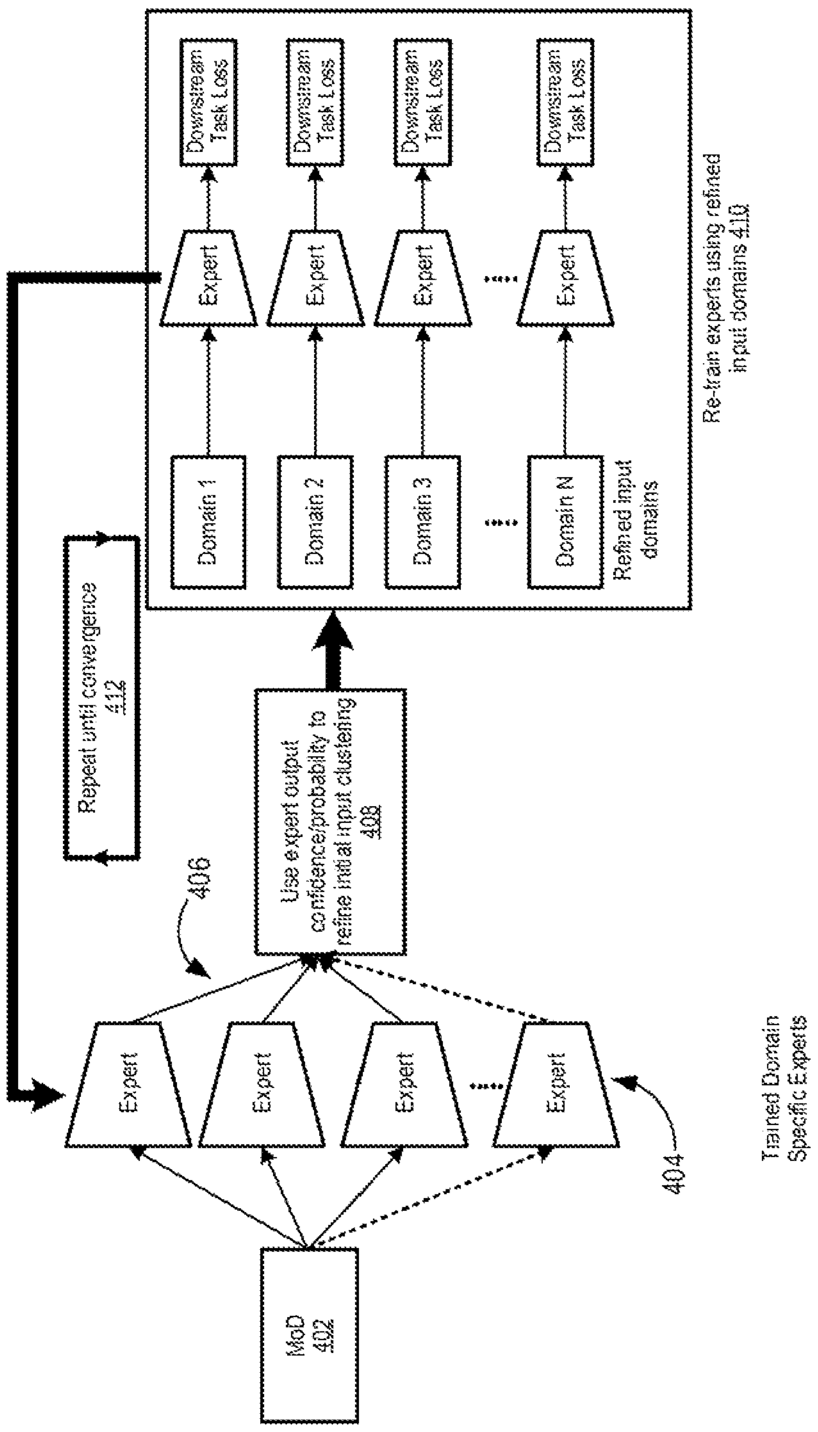
FIG. 4 illustrates an example diagram of the cluster refinement and expert re-training, in accordance with an example implementation.

In some aspects, for example as shown in FIG. 4, the following steps may be utilized for the iterative process.

Step 1: Feed the MoD inputs 402 to all the trained experts 404;

Step 2: Obtain the downstream task output probabilities 406 using the experts:

Step 3: Re-assign inputs 408 to the appropriate clusters based on the expert probabilities;

Step 4: Re-train the experts using the refined clusters 410; and

Repeat Step 1-Step 4 until convergence 412.

Figure 5:
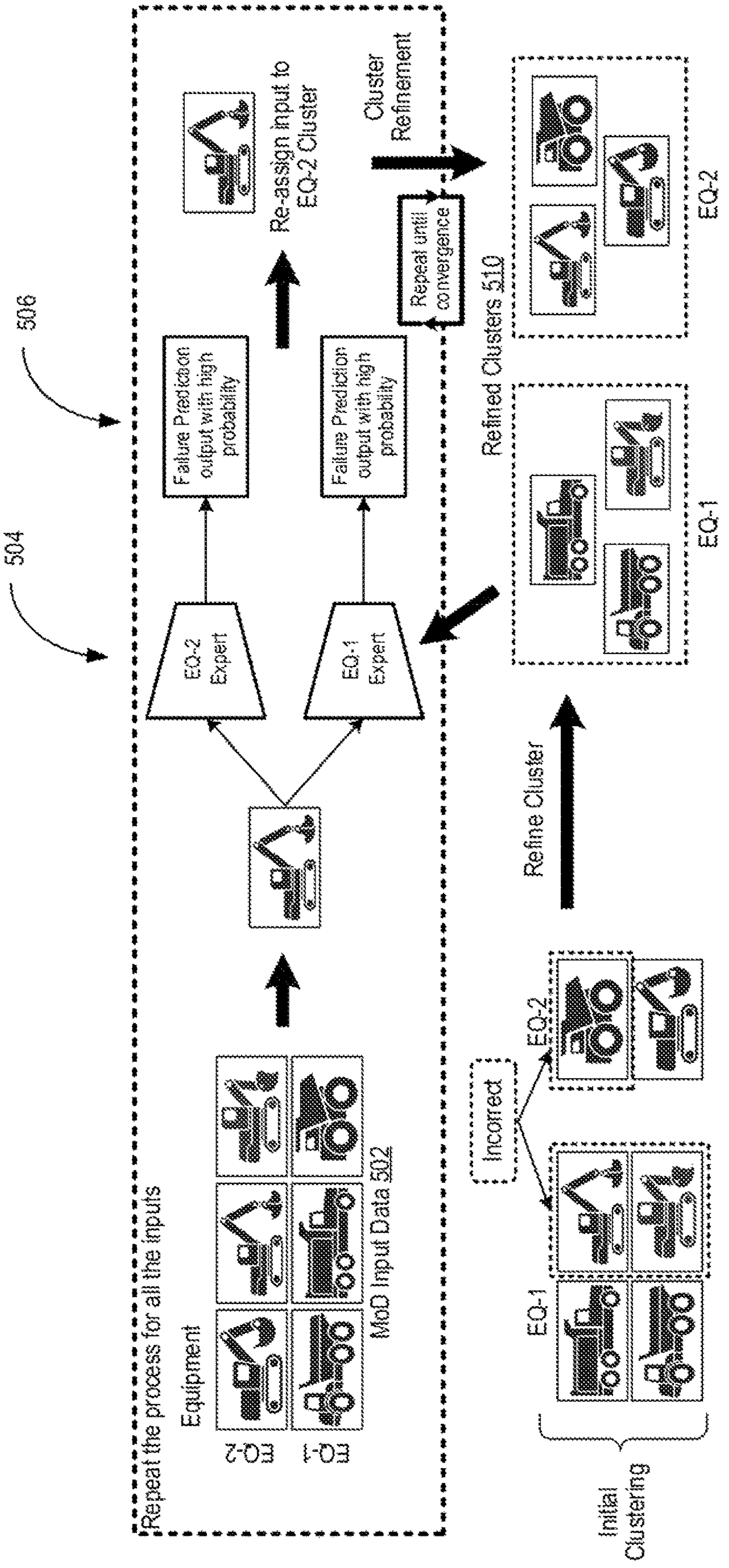
FIG. 5 illustrates an example diagram of the cluster refinement and the expert re-training using the equipment MoD example, in accordance with an example implementation.

FIG. 5 illustrates an example diagram of the cluster refinement and the expert re-training using the equipment MoD. For example, with reference to FIG. 5, the MoD input data 502 may comprise a first equipment set EQ-1 and a second equipment set EQ-2. The MoD input data 502 may input into all the experts 504 (e.g., EQ-1, EQ-2). The downstream task output probabilities 506 (e.g., failure prediction output with high probability) may be obtained using the experts 504 (e.g., EQ-1, EQ-2). The MoD input data 502 may be re-assigned to the appropriate cluster based on the expert probabilities. For example, as shown in FIG. 5, the MoD input may be re-assigned to a cluster associated with EQ-2. The re-assigned input may result in refined clusters 510. The experts 504 may be re-trained using the refined clusters 510. This process may repeat one or more times until convergence is achieved.

Figure 6A:
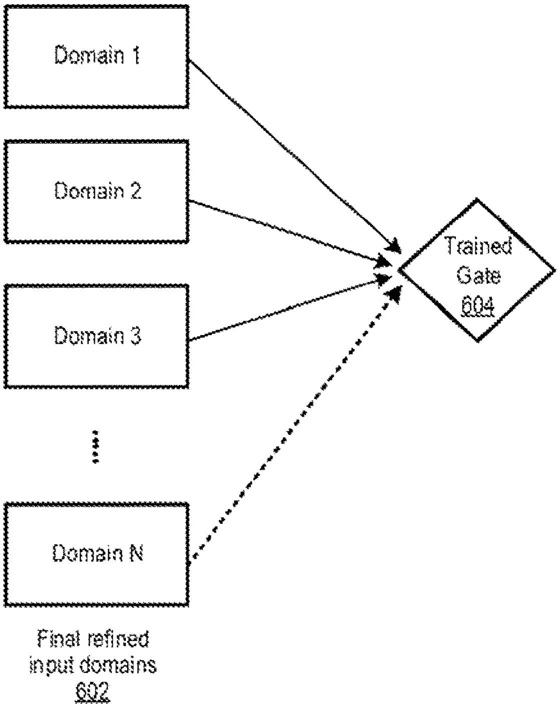
FIG. 6A illustrates an example diagram for a trained gate to route input to a correct expert, in accordance with an example implementation.
Figure 6B:
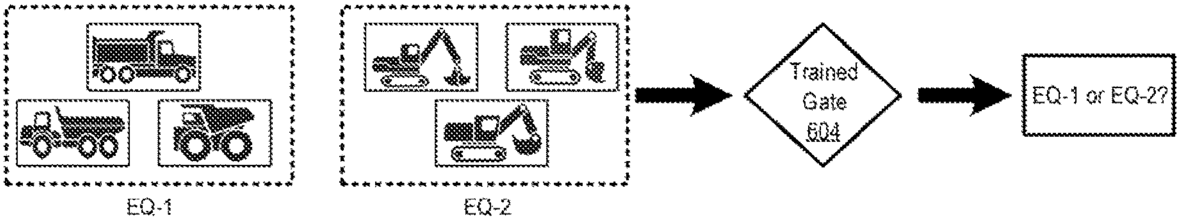

In some aspects, a final step of process may comprise selecting a corresponding domain specific expert for an input during model application, such that the input may be routed to the proper or corresponding expert. A learning mechanism may be utilized to perform this task. Using the final refined cluster/domain labels obtained from the previous step, a neural network may be trained which may serve the purpose of a gate. For example, with reference to FIG. 6A, the final refined input domains 602 (e.g., Domain 1, Domain 2, Domain 3, Domain N) may be inputted into the trained gate 604, such that the trained gate 604 may select the corresponding domain specific expert associated with input from the final refined input domains 602. With reference to FIG. 6B, the trained gate 604 may receive as input the MoD comprised of EQ-1 and/or EQ-2 and may determine the corresponding domains specific expert associated with EQ-1 or EQ-2 based on the input received.

The final inference during model application is performed by combining the trained gate 702 and the trained experts (e.g., 704-1, 704-2, 704-3, 704-*n*) as shown, for example, in FIG. 7. In the example of FIG. 7, a data flow 706 may comprise data that belongs to a first domain, and may be provided to the trained gate 702. The trained gate 702 may determine which expert should receive the data flow 706. In the example of FIG. 7, the trained gate 702 may review the data flow 706 and determine that the data flow 706 is part of the first domain, such that the data flow 706 is routed to the expert 704-1 that corresponds to the first domain.

Figure 8A:
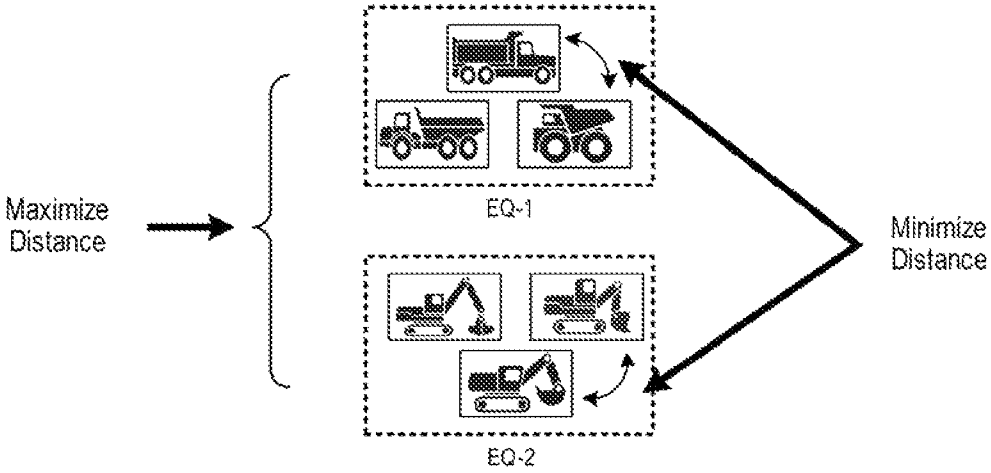
FIG. 8A illustrates an example of an intuition of a contrastive loss, in accordance with an example implementation.
Figure 8B:
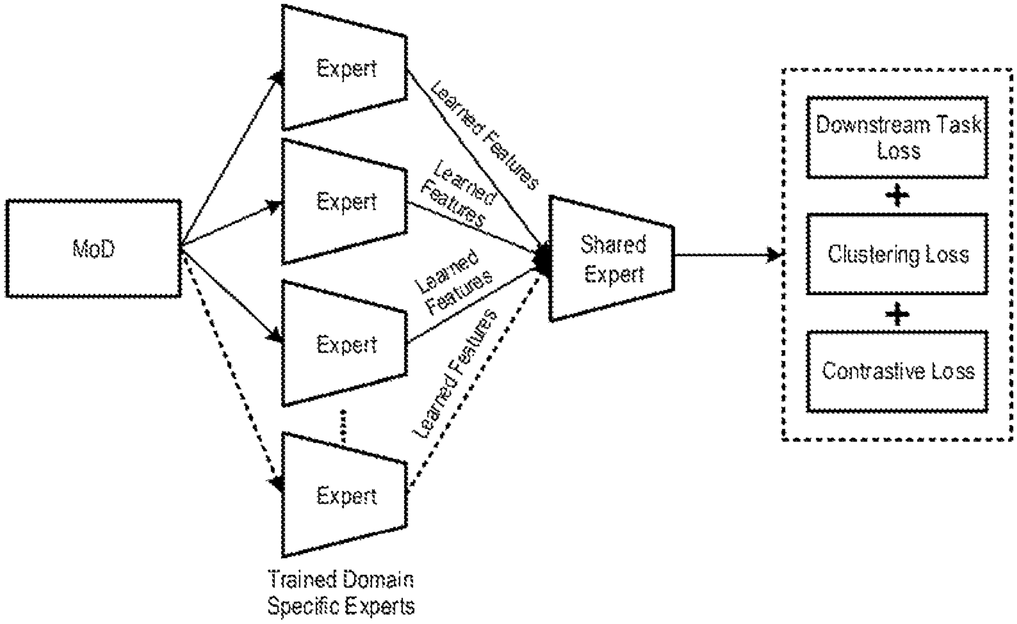
FIG. 8B illustrates an example of an end-to-end cluster refinement and expert fine-tuning model, in accordance with an example implementation.

In addition to the cluster refinement and expert re-training procedure as described herein, in some aspects, the trained domain specific experts may be utilized to implement an end-to-end model. An additional shared expert may be introduced after the domain specific experts which takes the learned features from the domain specific experts as input. The shared expert may comprise an extra layer/DL model between the domain specific experts and the output layer. In some aspects, in order to refine the clusters, a clustering loss may be utilized in addition to the downstream task loss. The shared expert may learn to discriminate the features obtained from the domain specific features which may influence the cluster refinement. The downstream task loss ensures that the domain specific expert weights are fine-tuned via back-propagation. An example clustering loss function is shown in Eq. 1:

$$J = \sum_{j=1}^{k} \sum_{i=1}^{n} \left\| x_i^{(j)} - c_j \right\|^2 \quad \text{Eq. 1}$$

where k represents the number of clusters, n represents the number of samples, $x_i$ represents the $i^{th}$ instance of input, $c_j$ represents centroid for cluster j, and the 2-norm represents the distance function. An example clustering loss function is shown in FIG. 8B.

In some aspects, the discriminative functionality of a loss function called contrastive loss may be leveraged to enhance the cluster refinement process. The contrastive loss function may minimize the distance between the similar data points (e.g., data belongs to the same cluster) and maximize the distance between the dissimilar data points (e.g., data belongs to different clusters), as shown for example in FIG. 8A. FIG. 8A provides an example of the underlying mechanism of the contrastive loss using the equipment example. The final end-to-end cluster refinement and expert fine-tuning model is trained by jointly optimizing the downstream task loss, clustering loss and the contrastive loss as shown in FIG. 8B.

Figure 7A:
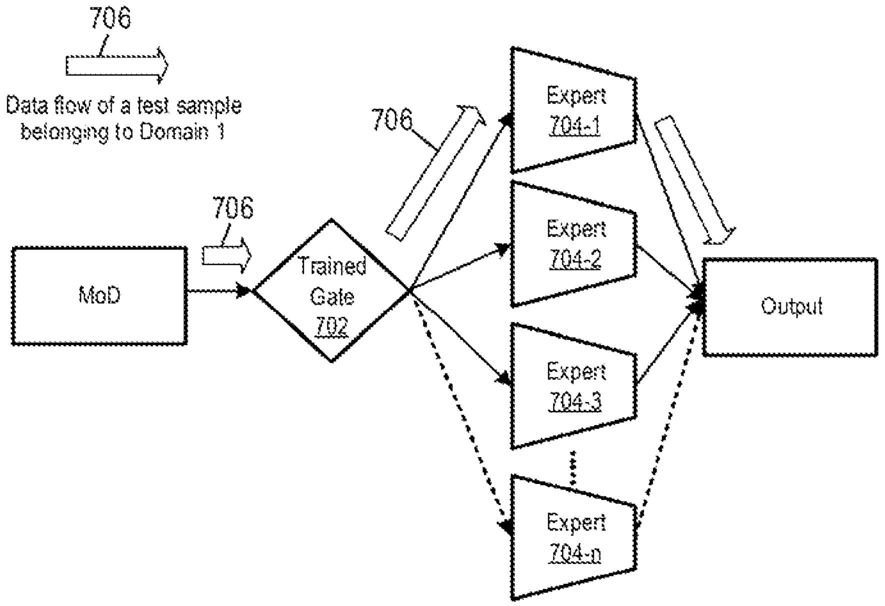
FIG. 7A illustrates an example diagram of a final inference mechanism, in accordance with an example implementation.
Figure 7B:
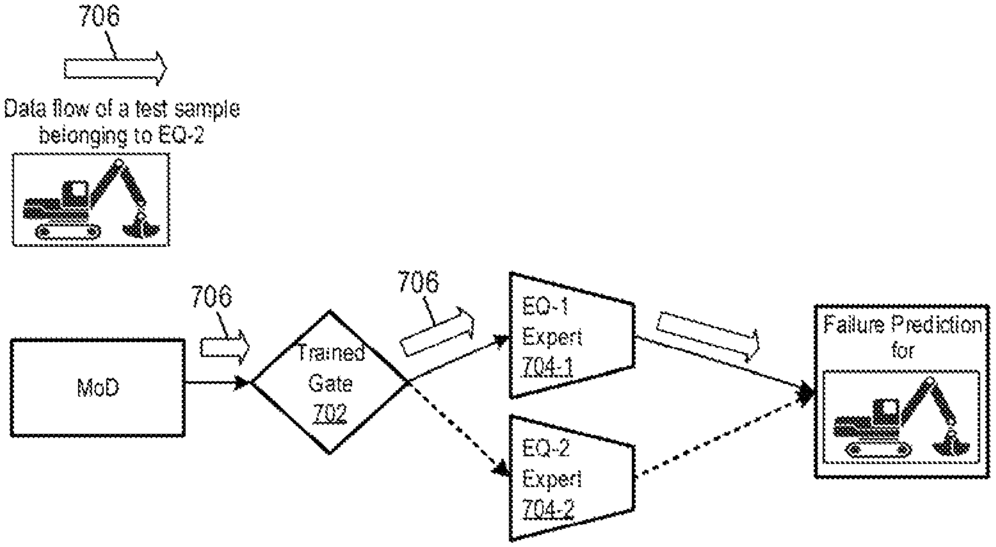
FIG. 7B illustrates an example diagram of the final inference mechanism using the equipment MoD example, in accordance with an example implementation.
Figure 9:
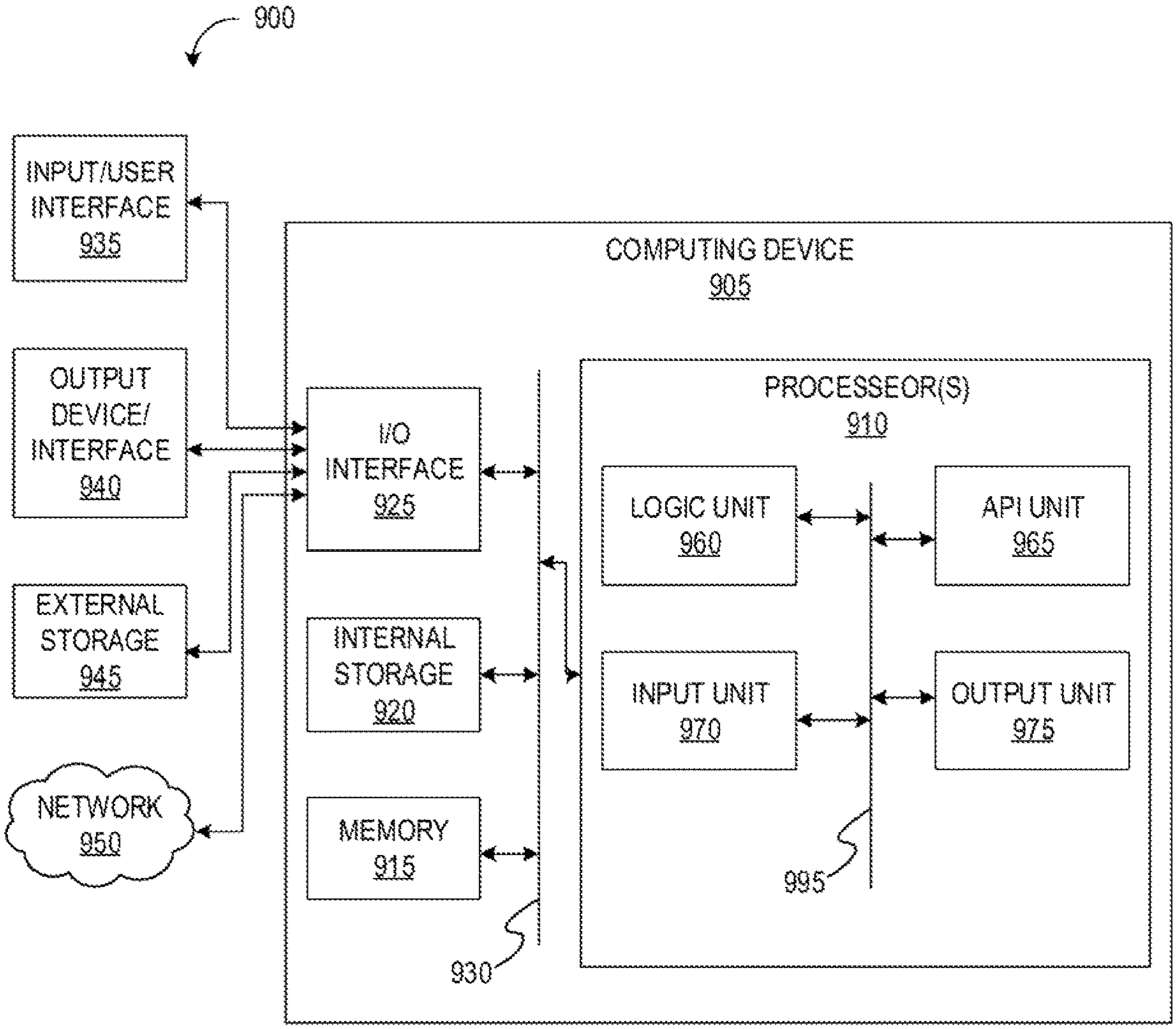
FIG. 9 illustrates an example computing environment with an example computer device suitable for use in some example implementations.

FIG. 9 illustrates an example computing environment with an example computer device suitable for use in some example implementations, such as a trained gate 702 as illustrated in FIG. 7A or 7B. The computing environment can be used to facilitate implementation of the architectures illustrated in FIGS. 1-8. Further, any of the example implementations described herein can be implemented based on the architectures, APIs, microservice systems, and so on as illustrated in FIGS. 1-8. Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905. I/O interface 925 is also configured to receive images from cameras or provide images to projectors or displays, depending on the desired implementation.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., C) ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript. and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of hardware processors such as central processing units (CPUs) or in a combination of hardware and software units.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide output based on the calculations described in example implementations.

Processor(s) 910 can be configured to execute instructions for a method, the instructions involving applying a clustering technique to a set of data comprised of multiple domains to obtain an initial domain separation of the set of data into one or more clusters; training one or more experts associated with each of the one or more clusters based on the initial domain separation where each expert corresponds with one domain of the multiple domains; inputting all data points to the one or more experts for refining each of the one or more clusters using expert output probabilities; retraining the one or more experts based on the refined one or more clusters; and training a gating mechanism to route an input to an appropriate expert of the one or more experts based on the refined one or more clusters, for example, in FIGS. 1-8B.

Processor(s) 910 can be configured to execute instructions for a method, wherein to refine each of the one or more clusters, the method involving re-assigning all the data points to a corresponding cluster of the one or more clusters based on the expert output probabilities, for example, in FIGS. 4 to 8B.

Processor(s) 910 can be configured to execute instructions for a method, the instructions involving applying a clustering technique to a set of data comprised of multiple domains to obtain an initial domain separation of the set of data into one or more clusters; training one or more experts associated with each of the one or more clusters based on the initial domain separation where each expert corresponds with one domain of the multiple domains; providing a set of data comprised of multiple domains to each of one or more experts; inputting output data of each of the one or more experts, based on the set of data, into a shared expert, in order to re-train the shared expert; and calculating a loss function, based on an output of the shared expert, to re-train the one or more experts, wherein weights of the one or more experts are adjusted based on errors back propagated by the loss function, for example, in FIGS. 8A and SB.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:

applying a clustering technique to a set of data comprised of multiple domains to obtain an initial domain separation of the set of data into one or more clusters;

training one or more domain-specific machine learning models associated with each of the one or more clusters based on the initial domain separation where each of the one or more domain-specific machine learning models corresponds with one domain of the multiple domains;

inputting all data points to each of the one or more domain-specific machine learning models to obtain expert output probabilities for each data point from each of the one or more domain-specific machine learning models;

iteratively refining each of the one or more clusters by re-assigning data points to clusters based on comparing expert output probabilities from each of the one or more domain-specific machine learning models, wherein a data point is re-assigned to a cluster corresponding to an expert offering a higher output probability than the expert originally trained for that data point;

retraining the one or more domain-specific machine learning models based on the refined one or more clusters; and training a gating mechanism to route an input to an appropriate model of the one or more domain-specific machine learning models based on the refined one or more clusters.

2. The method of claim 1, wherein the set of data is separated into different clusters associated with different domains by the clustering technique.

3. The method of claim 1, wherein each of the multiple domains corresponds to a respective cluster of the one or more clusters.

4. The method of claim 1, wherein the input comprises the set of data and additional data.

5. The method of claim 1, wherein the training of the one or more domain-specific machine learning models repeats until a convergence with regards to a clustering performance of the one or more clusters is obtained.

6. The method of claim 1, wherein each of the one or more clusters are refined based on the expert output probabilities.

7. The method of claim 1, wherein to refine each of the one or more clusters, the method further comprising:

re-assigning all the data points to a corresponding cluster of the one or more clusters based on the expert output probabilities.

8. The method of claim 1, wherein a downstream task output probability is determined for the input based on the gating mechanism routing the input to the appropriate expert.

9. A non-transitory computer readable medium, storing instructions for execution by one or more hardware processors, the instructions comprising:

applying a clustering technique to a set of data comprised of multiple domains to obtain an initial domain separation of the set of data into one or more clusters;

training one or more domain-specific machine learning models associated with each of the one or more clusters based on the initial domain separation where each of the one or more domain-specific machine learning models corresponds with one domain of the multiple domains;

inputting all data points to each of the one or more domain-specific machine learning models to obtain expert output probabilities for each data point from each of the one or more domain-specific machine learning models;

iteratively refining each of the one or more clusters by re-assigning data points to clusters based on comparing expert output probabilities from each of the one or more domain-specific machine learning models, wherein a data point is re-assigned to a cluster corresponding to an expert offering a higher output probability than the expert originally trained for that data point;

retraining the one or more domain-specific machine learning models based on the refined one or more clusters; and training a gating mechanism to route an input to an appropriate model of the one or more domain-specific machine learning models based on the refined one or more clusters.

10. The non-transitory computer readable medium of claim 9, the instructions further comprising:

re-assigning all the data points to a corresponding cluster of the one or more clusters based on the expert output probabilities.

11. A method, comprising:

applying a clustering technique to a set of data comprised of multiple domains to obtain an initial domain separation of the set of data into one or more clusters;

training one or more domain-specific machine learning models associated with each of the one or more clusters based on the initial domain separation where each of the one or more domain-specific machine learning models corresponds with one domain of the multiple domains;

providing a set of data comprised of multiple domains to each of the one or more domain-specific machine learning models;

inputting output data of each of the one or more domain-specific machine learning models, based on the set of data, into a shared expert, in order to re-train the shared expert; and calculating a loss function, based on an output of the shared expert, to re-train the one or more domain-specific machine learning models, wherein weights of the one or more domain-specific machine learning models are adjusted based on errors back propagated by the loss function; and iteratively refining each of the one or more clusters by re-assigning data points to clusters based on comparing expert output probabilities from each of the one or more domain-specific machine learning models, wherein a data point is re-assigned to a cluster corresponding to an expert offering a higher output probability than the expert originally trained for that data point.

12. The method of claim 11, wherein the loss function comprises at least one of a downstream task loss, a clustering loss, or a contrastive loss.

13. The method of claim 12, wherein the contrastive loss is configured to minimize a distance between similar data points within the set of data, and wherein the similar data points are associated with a same model of the one or more domain-specific machine learning models.

14. The method of claim 12, wherein the contrastive loss is configured to maximize a distance between dissimilar data points within the set of data, wherein the dissimilar data points are associated with a different model of the one or more domain-specific machine learning models.

15. The method of claim 12, wherein a downstream task output probability is determined for the set of data based on the output of each of the one or more domain-specific machine learning models.

16. The method of claim 12, wherein the clustering loss is configured to reline one or more clusters associated with the one or more domain-specific machine learning models.

17. The method of claim 16, wherein the set of data is separated into different clusters associated with different domains of the multiple domains.

18. The method of claim 16, wherein each of the one or more clusters are refined based on expert output probabilities of the one or more domain-specific machine learning models.

19. A non-transitory computer readable medium, storing instructions for execution by one or more hardware processors, the instructions comprising:

applying a clustering technique to a set of data comprised of multiple domains to obtain an initial domain separation of the set of data into one or more clusters;

training one or more domain-specific machine learning models associated with each of the one or more clusters based on the initial domain separation where each of the one or more domain-specific machine learning models corresponds with one domain of the multiple domains; providing a set of data comprised of multiple domains to each of the one or more domain-specific machine learning models;

inputting output data of each of the one or more domain-specific machine learning models, based on the set of data, into a shared expert, in order to re-train the shared expert; and calculating a loss function, based on an output of the shared expert, to re-train the one or more domain-specific machine learning models, wherein weights of the one or more domain-specific machine learning models are adjusted based on errors back propagated by the loss function; and iteratively refining each of the one or more clusters by re-assigning data points to clusters based on comparing expert output probabilities from each of the one or more domain-specific machine learning models, wherein a data point is re-assigned to a cluster corresponding to an expert offering a higher output probability than the expert originally trained for that data point.

20. The non-transitory computer readable medium of claim 19, wherein the loss function comprises at least one of a downstream task loss, a clustering loss, or a contrastive loss.

* * * * *